(12) United States Patent
Chang

(10) Patent No.: US 10,723,579 B2
(45) Date of Patent: Jul. 28, 2020

(54) PIVOTING ASSEMBLY AND CONTAINER INCLUDING THEREOF

(71) Applicant: MERRY ELECTRONICS (SHENZHEN) CO., LTD., Guangdong (CN)

(72) Inventor: Hsiang-Sen Chang, Taichung (TW)

(73) Assignee: MERRY ELECTRONICS (SHENZHEN) CO., LTD., Guangdong (CN)

( * ) Notice: Subject to any disclaimer, the term of this patent is extended or adjusted under 35 U.S.C. 154(b) by 0 days.

(21) Appl. No.: 16/258,696

(22) Filed: Jan. 28, 2019

(65) Prior Publication Data
US 2020/0095083 A1    Mar. 26, 2020

(30) Foreign Application Priority Data
Sep. 21, 2018 (TW) .............................. 107133476 A (51) Int. Cl.
| | |
|---|---|
| *E05D 11/08* | (2006.01) |
| *B65H 27/00* | (2006.01) |
| *B65D 85/00* | (2006.01) |
| *B65H 23/02* | (2006.01) |
| *F16C 13/00* | (2006.01) |

(52) U.S. Cl.
CPC .............. *B65H 27/00* (2013.01); *B65D 85/00* (2013.01); *B65H 23/02* (2013.01); *F16C 13/00* (2013.01)

(58) Field of Classification Search
CPC .......... B65D 85/00; B65D 43/165–169; B65F 1/1646; G06F 1/1681; G06F 1/1616; E05Y 2900/606; E05Y 2201/26; H04M 1/0216; E05D 11/082; E05D 11/084; E05D 11/085; E05D 3/02; E05D 5/14; E05D 2005/145; F16C 11/04
See application file for complete search history.

(56) References Cited

U.S. PATENT DOCUMENTS

| | | | | |
|---|---|---|---|---|
| 4,617,699 A | * | 10/1986 | Nakamura ............. | B60J 3/0252 16/262 |
| 4,734,955 A | * | 4/1988 | Connor .................. | B60J 3/0265 16/332 |
| 5,338,083 A | * | 8/1994 | Gute ...................... | B60J 3/0265 296/97.12 |
| 5,795,010 A | * | 8/1998 | Dalbard ................. | B60J 3/0265 296/97.13 |
| 5,871,252 A | * | 2/1999 | Gute ...................... | B60J 3/0239 296/97.11 |

(Continued)

*Primary Examiner* — Chuck Y Mah
(74) *Attorney, Agent, or Firm* — CKC & Partners Co., LLC (57) ABSTRACT

A pivoting assembly includes a fixing member and a rotating member. The fixing member includes a positioning portion and a limiting portion. The limiting portion has a limiting surface facing the positioning portion. The limiting surface is a curved concave surface. The rotating member is clamped between the positioning portion and the limiting surface, is configured to rotate relative to the fixing member, and has first and second abutting surfaces and an acting curved surface surrounding thereof. While the rotating member is rotating relative to the fixing member, the acting curved surface bears against and rotates relative to the limiting surface, thereby enabling the positioning portion to selectively abut one of the first abutting surface and the second abutting surface.

10 Claims, 10 Drawing Sheets

(56) References Cited

U.S. PATENT DOCUMENTS

| | | | | |
|---|---|---|---|---|
| 5,924,748 A * | 7/1999 | Zapinski | B60J 3/0265 296/97.1 |
| 6,230,365 B1 * | 5/2001 | Lu | G06F 1/1616 16/16 |
| 6,470,532 B2 * | 10/2002 | Rude | G06F 1/1616 16/313 |
| 6,584,646 B2 * | 7/2003 | Fujita | G06F 1/1616 16/342 |
| 6,983,514 B2 * | 1/2006 | Lu | G06F 1/1616 16/303 |
| 7,451,522 B2 * | 11/2008 | Lu | E05D 11/02 16/342 |
| 7,958,600 B2 * | 6/2011 | Kuo | G06F 1/1616 16/342 |
| 8,074,322 B2 * | 12/2011 | Wang | G06F 1/1616 16/342 |
| 8,256,065 B2 * | 9/2012 | Ikunami | B60R 11/0235 16/342 |
| 9,206,633 B1 * | 12/2015 | Ju | G06F 1/1681 |
| 2006/0265839 A1 * | 11/2006 | Lu | G06F 1/1616 16/342 |
| 2006/0267369 A1 * | 11/2006 | Kearns | B60J 3/0265 296/97.12 |
| 2006/0272128 A1 * | 12/2006 | Rude | E05D 11/084 16/342 |
| 2009/0134657 A1 * | 5/2009 | Asai | B60J 3/0239 296/97.11 |
| 2010/0019527 A1 * | 1/2010 | Asai | B60J 3/0217 296/97.1 |
| 2011/0239408 A1 * | 10/2011 | Chang | G06F 1/1681 16/386 |
| 2012/0204380 A1 * | 8/2012 | Chen | E05D 11/082 16/342 |
| 2014/0007379 A1 * | 1/2014 | Yang | G06F 1/1681 16/277 |
| 2014/0310915 A1 * | 10/2014 | Tung | E05D 11/082 16/342 |
| 2019/0211599 A1 * | 7/2019 | Ju | E05D 3/02 |

* cited by examiner

PIVOTING ASSEMBLY AND CONTAINER INCLUDING THEREOF

CROSS-REFERENCE TO RELATED APPLICATION

This application claims priority to Taiwan Application Serial Number 107133476, filed Sep. 21, 2018, which is herein incorporated by reference in its entirety.

BACKGROUND

Field of Invention

The present invention relates to a pivoting assembly. More particularly, the present invention relates to a container including a pivoting assembly.

Description of Related Art

Various conventional containers are basically composed of an upper cover and a box. The upper cover and the box are usually produced by a plastic injection molding process or by a metal stamping process. Furthermore, the upper cover and the box can be connected by means of a hinge connection.

In addition, the upper cover and the box of the container are generally provided with plastic bumps respectively. When the upper cover is opened relative to the box, the plastic bumps resist against each other to prevent the upper cover from being overly unfolded relative to the box. Further, if the upper cover is being shaken, the upper cover tends to cover the box. Therefore, a torsion spring is often disposed between the upper cover and the box of the container to provide a torsion force to resist and prevent the upper cover from covering the box due to being shaken.

However, the plastic bumps placed on the upper cover and the box are likely to wear out after long term of operation, and lose their function. Also, when the upper cover covers the box, the torsion spring disposed between the upper cover and the box may cause the upper cover to collide with the box due to too much force exerted thereon, thus further causing the contents in the container to be damaged by vibration.

SUMMARY

The invention provides a pivoting and a container includes the pivoting assembly.

In some embodiments, a pivoting assembly includes a fixing member and a rotating member. The fixing member includes a positioning portion and a limiting portion. The limiting portion has a limiting surface facing the positioning portion. The limiting surface is a curved concave surface. The rotating member is clamped between the positioning portion and the limiting surface, and is configured to rotate relative to the fixing member, and has first and second abutting surfaces and an acting curved surface surrounding thereof. While the rotating member is rotating relative to the fixing member, the acting curved surface bears against and rotates relative to the limiting surface, thereby enabling the positioning portion to selectively abut one of the first abutting surface and the second abutting surface.

In some embodiments, a container includes the pivoting assembly, a box, and a cover. The box is connected to the fixing member of the pivoting assembly. The cover is connected to the rotating member of the pivoting assembly.

In some embodiments, the limiting surface of the fixing member has a first curvature. The acting cured surface has a second curvature substantially identical to the first curvature.

In some embodiments, the positioning portion has a positioning surface facing the limiting portion. A profile of the positioning surface is complimentary to the first and second abutting surfaces of the rotating member.

In some embodiments, each of the first and second abutting surfaces is flat.

In some embodiments, the first and second abutting surface of the rotating member form a V-shaped profile.

In some embodiments, the rotating member further includes a turning surface that is connected between the first and second abutting surface and protrudes away from the acting curved surface.

In some embodiments, the pivoting assembly further includes an elastic element that is connected between the positioning portion and the limiting portion and is configured to cause the positioning portion and the limiting portion to clamp the rotating member.

In some embodiments, the first and second abutting surface of the rotating member intersects at an first angle. When the cover covers the box, the positioning portion of the fixing member abuts against the first abutting surface of the rotating member. When the cover is opened by rotating the first angle relative to the fixing member, the positioning portion of the fixing member abuts against the second abutting surface of the rotating member.

In some embodiments, the cover has an assembling hole. The pivoting assembly further includes an assembling member that is connected to the rotating member and is detachably fixed to the assembling hole of the cover.

In some embodiments, by the angle between the first abutting surface and the second abutting surface of the rotating member of the pivoting assembly, after the user flips the cover of the container, the cover can automatically position relative to the box at the open position defined by the aforementioned angle. That is, a plurality of abutting faces in the pivoting assembly can be used to position the angle at which the cover in the container opens relative to the box.

Moreover, when the user accidentally touches the cover such that the cover is opened relative to the box body and is less than half of the aforementioned angle, since the limiting portion presses the rotating member to recover the rotating member, the cover connected to the rotating member can automatically cover the box. In contrast, when the cover opens the aforementioned angle with respect to the box, the cover connected to the rotating member is positioned because the elastic portion presses the positioning portion and the limiting portion to prevent the rotating member between the positioning portion and the limiting portion from rotating. Therefore, the user needs to apply a force to overcome the compression of the elastic portion to cause the cover to rotate relative to the box.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 3A and FIG. 3B illustrate perspective views showing the container under different assembly stages respectively according to some embodiments of the present disclosure, in which FIG. 3B is further a perspective cross-sectional view of the container viewed along line 1-1 in FIG. 1A.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1A:
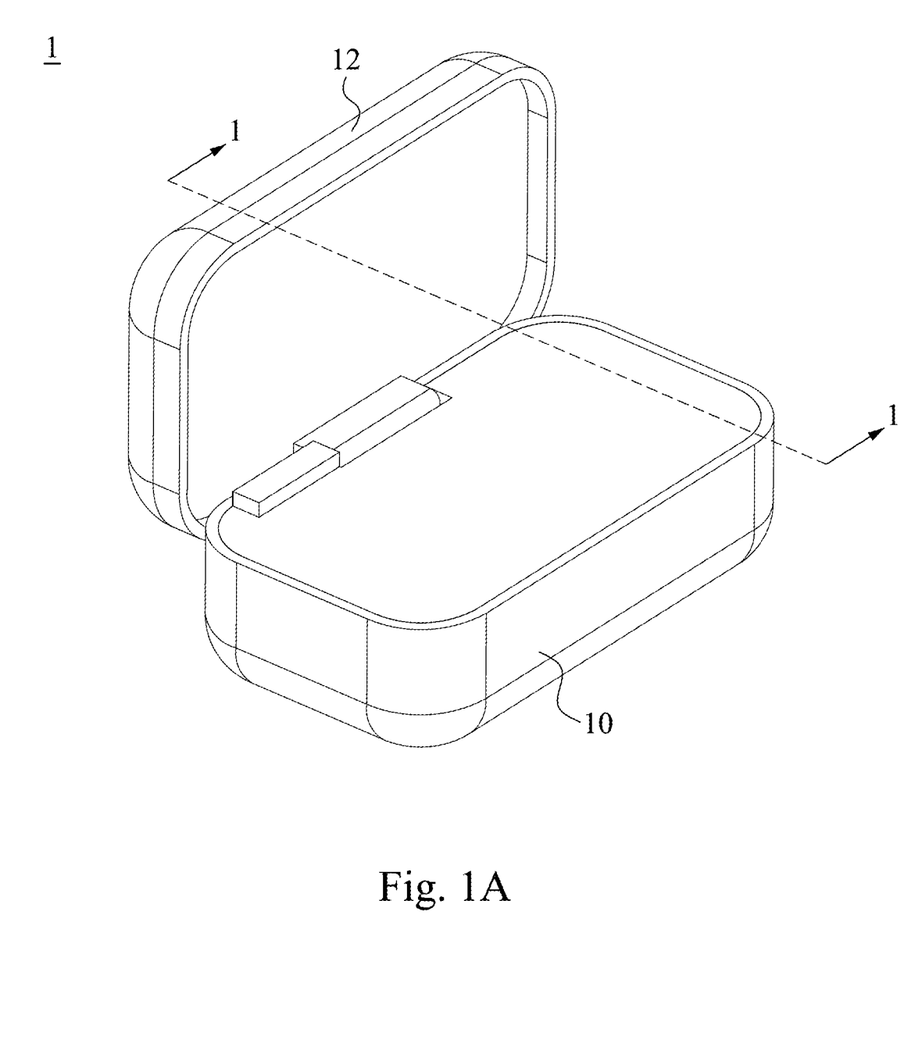
FIG. 1A illustrates a perspective view showing a container according to some embodiments of the present disclosure.
Figure 1B:
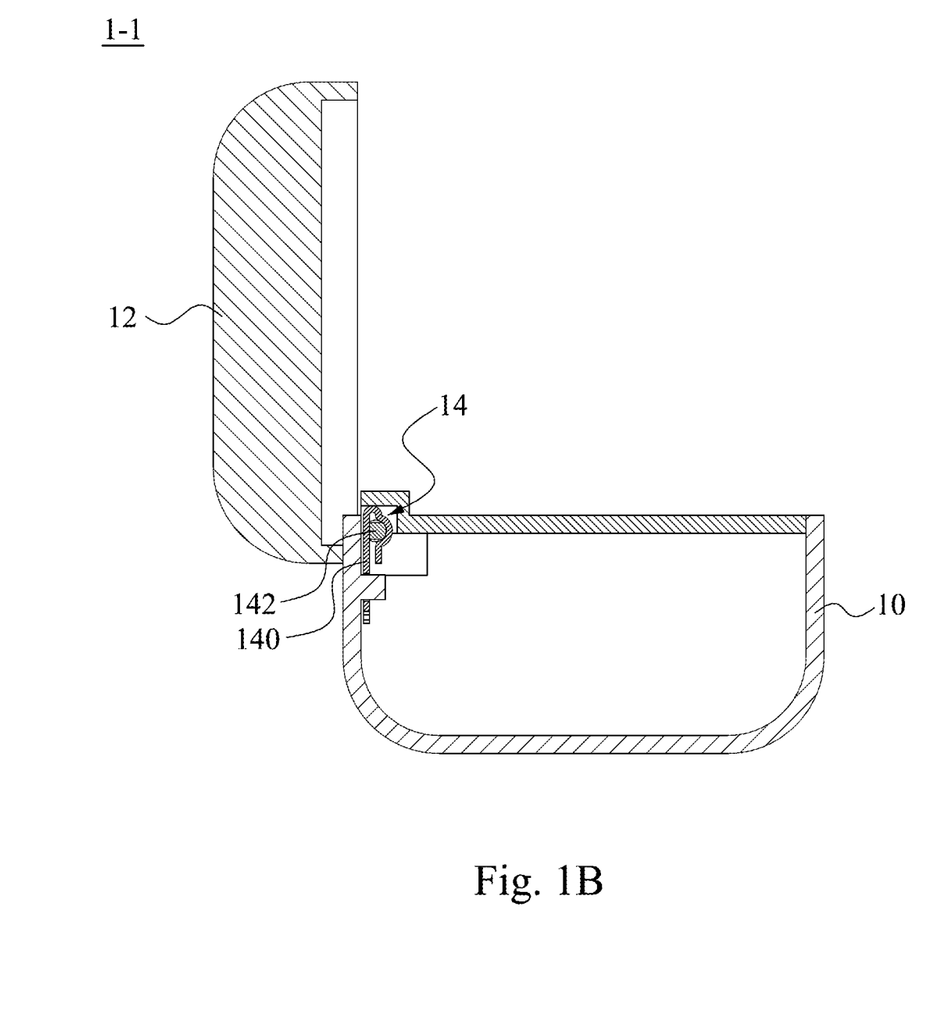
FIG. 1B is a cross-sectional view of the container viewed along line 1-1 in FIG. 1A.

Reference is made to FIG. 1A and FIG. 1B. FIG. 1A illustrates a perspective view showing a container 1 according to some embodiments of the present disclosure. FIG. 1B is a cross-sectional view of the container viewed along line 1-1 in FIG. 1A. As shown in FIG. 1A and FIG. 1B, the container 1 includes a box 10, a cover 12, and a pivoting assembly 14 (as shown in FIG. 1B). In FIG. 1B, the pivoting assembly 14 includes fixing member 140, a rotating member 142, and an elastic element 16. The box 10 of the container 1 is connected to the fixing member 140 of the pivoting assembly 14. The cover 12 of the container 1 is connected to the rotating member 142 of the pivoting assembly 14. The structures and functions of the elements and the relationship therebetween are described in detail hereinafter.

Figure 2A:
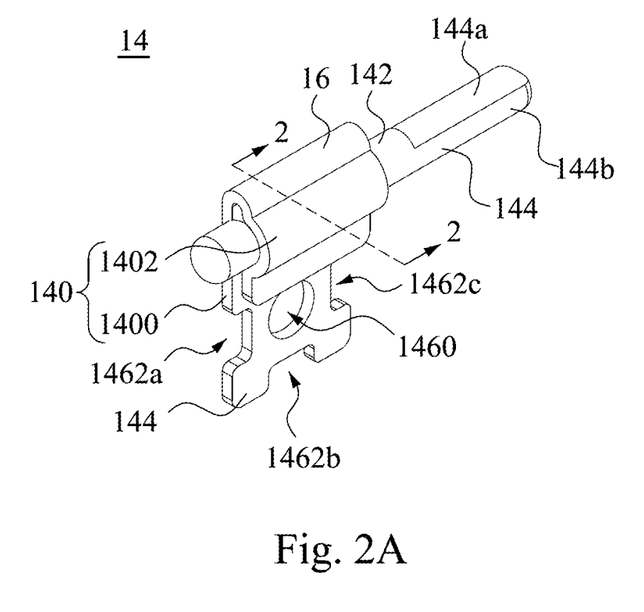
FIG. 2A illustrates a perspective view showing a pivoting assembly according to some embodiments of the present disclosure.
Figure 2B:
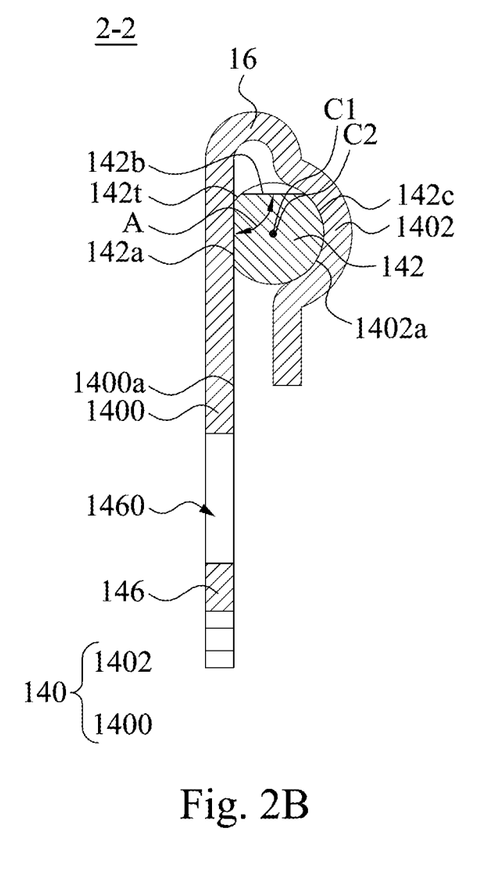
FIG. 2B is a cross-sectional view of the pivoting assembly viewed along line 2-2 in FIG. 2A.
Figure 2C:
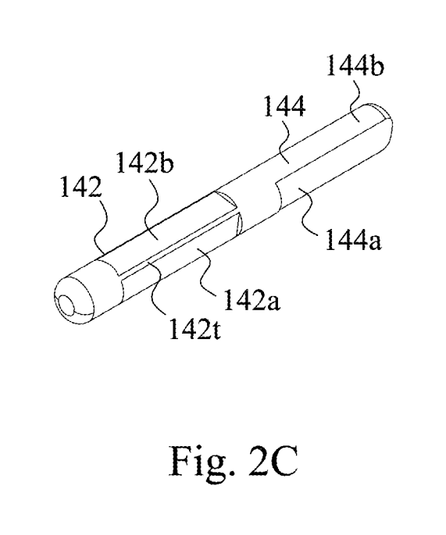
FIG. 2C illustrates a perspective view showing a rotating member according to some embodiments of the present disclosure.

Reference if made to FIG. 2A, FIG. 2B, and FIG. 2C. FIG. 2A illustrates a perspective view showing the pivoting assembly 14 according to some embodiments of the present disclosure. FIG. 2B is a cross-sectional view of the pivoting assembly viewed along line 2-2 in FIG. 2A. FIG. 2C illustrates a perspective view showing the rotating member 142 according to some embodiments of the present disclosure.

As shown in FIG. 2A and FIG. 2B, the fixing member 140 of the pivoting assembly 14 includes a positioning portion 1400 and a limiting portion 1402 opposite to the positioning portion 1400. The positioning portion 1400 and the limiting portion 1402 of the fixing member 140 are substantially sheet structures, but the present disclosure is not limited thereto. The elastic element 16 of the pivoting assembly 14 is connected between the positioning portion 1400 and the limiting portion 1402 and is used to clamp the rotating member 142 between the positioning portion 1400 and the limiting portion 1402. In some embodiments, the elastic element 16 is a U-shaped sheet-like structure, and the opposite ends thereof are respectively connected to the positioning portion 1400 and the limiting portion 1402 of the fixing member 140. The positioning portion 1400 and the limiting portion 1402 of the fixing member 140 extend away from the elastic portion 16 substantially in the same direction.

In the present embodiment, the positioning portion 1400, the limiting portion 1402 and the elastic element 16 integrally formed structures, but the present disclosure is not limited thereto. In some embodiment, any element that can be used to cause the positioning portion 1400 and the limiting portion 1402 to clamp the rotating member 142 can be applied to the elastic portion 16 of the present disclosure. For example, the elastic element 16 can also be a spring structure.

As shown in FIG. 2B, the positioning portion 1400 of the fixing member 140 has a positioning surface 1400a facing the limiting portion 1402. In the embodiment, the positioning surface 1400a of the positioning portion 1400 is substantially a flat surface, but the present disclosure is not limited thereto. Relatively, the limiting portion 1402 of the fixing member 140 has a limiting surface 1402a facing the positioning portion 1400. The limiting surface 1402 is curved concave surface and recesses away from the positioning portion 1400.

In the embodiment, the limiting surface 1402a of the limiting portion 1402 of the fixing member has a first curvature and has a first curvature center line C1. In the embodiment, the curvature center line C1 of the limiting surface 1402a is located between the positioning portion 1400 and the limiting portion 1402 and is spaced apart from the positioning portion 1400. In other words, the curvature center line C1 of the limiting surface 1402a is substantially parallel to the limiting surface 1402a. In the embodiment, the curvature center line C1 of the limiting surface 1402a is configured to pass through the rotating member 142.

As shown in FIG. 2A and FIG. 2B, the rotating member 142 of the pivoting assembly 14 is interposed between the positioning portion 1400 of the fixing member 140 and the limiting surface 1402a of the limiting portion 1402 and is configured to rotate relative to the fixing member 140. In some embodiments, as shown in FIG. 2C, the rotating member 142 has a first abutting surface 142a, a second abutting surface 142b, and an acting curved surface 142c surrounding thereof(as shown in FIG. 2B, not shown in the perspective of FIG. 2C) and includes a turning surface 142t that is connected between the first abutting surface 142a and the second abutting surface 142b.

In FIG. 2B, the first abutting surface 142a of the rotating member 142 of the pivoting assembly 14 is complementary to a contour of the positioning surface 1400a of the positioning portion 1400 of the fixing member 140. In the embodiment, the first abutting surface 142a of the rotating member 142 is substantially a flat surface, but the present disclosure is not limited thereto. Similarly, the second abutting surface 142b of the rotating member 142 of the pivoting assembly 14 is complementary to the contour of the positioning surface 1400a of the positioning portion 1400 of the fixing member 140. In the embodiment, the first abutting surface 142b of the rotating member 142 is substantially a flat surface, but the present disclosure is not limited thereto.

In the embodiment, the first abutting surface 142a and the second abutting surface 142b of the rotating member 142 of the pivot assembly 14 form a V-shaped profile. In some embodiments, the first abutting surface 142a and the second abutting surface 142b of the rotating member 142 of the pivot assembly 14 form an angle A therebetween. As shown in FIG. 2B, the first abutting surface 142a is substantially perpendicular to the second abutting surface 142b, but the present disclosure is not limited thereto. In some embodiments, the angle A can also be an acute or obtuse angle. For example, the angle A can be 30 degrees, 60 degrees, or 120 degrees.

In FIG. 2B, the acting curved surface 142c of the rotating member 142 of the pivot assembly 14 is connected between the first abutting surface 142a and the second abutting surface 142b and convex away from the first abutting face 142a and the second abutting face 142b. The acting curved surface 142c of the rotating member 142 has a second curvature and has a second curvature center line C2. The second curvature of the acting curved surface 142c of the rotating member 142 is substantially the same as the first curvature of the limiting surface 1402a of the fixing member 140. Therefore, in the embodiment, a contour of the acting curved surface 142c of the rotating member 142 is complementary to the limiting surface 1402a of the fixing member 140.

In the embodiment, the second curvature center line C2 of the acting curved surface 142c passes through the rotating member 142 and is spaced apart from the first abutting surface 142a and the second abutting surface 142b. In other words, the second curvature center line C2 of the rotating member 142 is parallel to the first abutting surface 142a and the second abutting surface 142b. In the embodiment, the acting curved surface 142c of the rotating member 142 of the pivoting assembly 14 is configured to coincide with the first curvature center line C1 of the limiting surface 1402a.

As shown in FIG. 2B and FIG. 2C, the turning surface 142t of the rotating member 142 of the pivoting assembly 14 protrudes away from the acting curved surface 142c, but the present disclosure is not limited thereto. In some embodiments, the turning surface 142t can be a flat surface. In the present embodiment, the turning surface 142t and the acting curved surface 142c are located at two opposite sides of the second curvature center line C2.

Figure 3A:
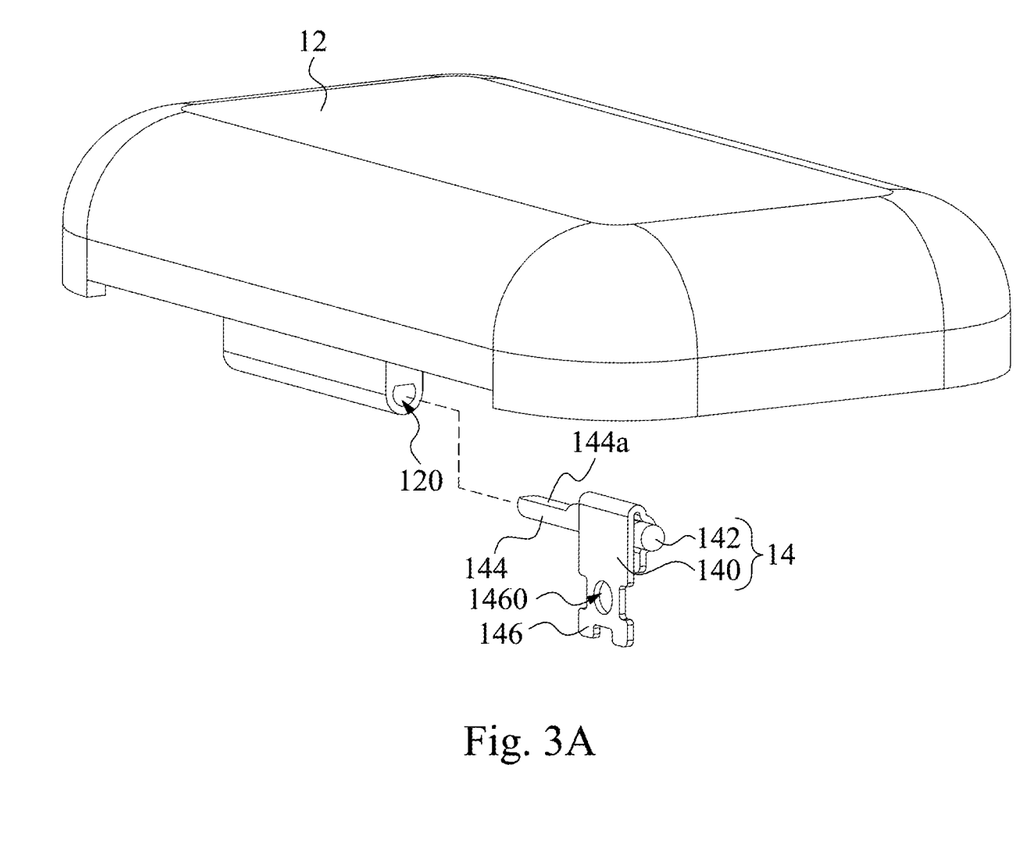
Figure 3B:
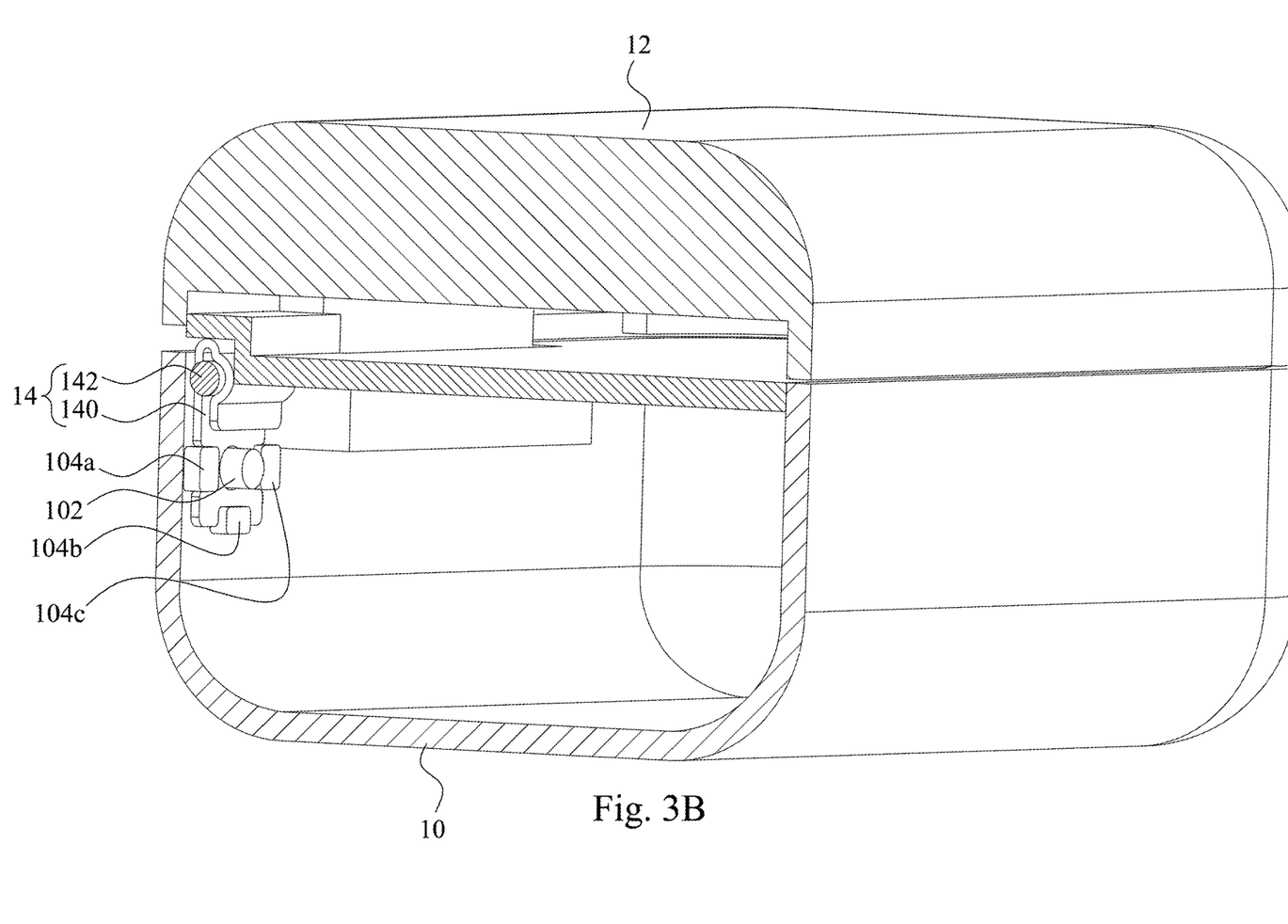

Next, an assembly procedure of the container 1 will be described such that the box 10 and the cover 12 of the container 1 are pivotally connected by the pivot assembly 14. Reference is made to FIG. 2A, FIG. 2C, FIG. 3A, and FIG. 3B. FIG. 3A and FIG. 3B illustrate perspective views showing the container 1 under different assembly stages respectively according to some embodiments of the present disclosure, in which FIG. 3B is further a perspective cross-sectional view of the container viewed along line 1-1 in FIG. 1A. The structure and function of the pivoting assembly 14 and the box 10 and the cover 12 that are engaged with the pivoting assembly 14 and the relationship therebetween are described in detail hereinafter.

In FIG. 2A and FIG. 2C, the pivot assembly 14 further includes a first assembling member 144. The first assembling member 144 is a columnar structure. The first assembling member 144 of the pivot assembly 14 is connected to an end of the rotating member 142 and extends substantially along the second curvature center line C2 (as shown in FIG. 2B) of the rotating member 142. The first assembling member 144 has a non-circular cross section on a plane perpendicular to the second curvature center line C2.

In some embodiments, the first assembling member 144 of the pivot assembly 14 has a first assembling surface 144a and a second assembling surface 144b surrounding thereof. In the embodiment, the second assembling surface 144b is a circular arc surface. The first assembling surface 144a is a flat surface and is coplanar with the first abutting surface 142a of the rotating member 142. Hence, when the first abutting surface 142a is formed on the rotating member 142, the method of forming the first abutting surface 142a can be simultaneously applied to the first assembling surface 144a formed on the first assembling member 144 to reduce the manufacturing time and cost of the first assembling member 144.

As shown in FIG. 3A, the cover 12 of the container 1 has a first assembling hole 120. An inner wall of the first assembling hole 120 of the cover 12 is complementary to contours of the first and second assembling faces 144a and 144b of the first assembling member 144. Therefore, the first assembling member 144 of the pivot assembly 14 is removably secured to the first assembling hole 120 of the cover 12 of the container 1. Since the first assembling member 144 has a non-circular cross section, the first assembling member 144 and the first assembling hole 120 are engaged with each other and cannot be rotated.

In some embodiments, the rotating member 142 of the pivot assembly 14 and the cover 12 of the container 1 are integrally formed, and the first assembling hole 120 cannot be required to be set on the cover 12. In some embodiments, any component that can be used to engage the rotating member 142 with the cover 12 can be applied to the first assembling member 144 of the present disclosure. For example, the first assembling member 144 can also be an adhesive layer for bonding between the rotating member 142 and the cover 12.

In FIG. 2A and FIG. 2B, the pivot assembly 14 further includes a second assembling member 146. The second assembling member 146 is a sheet structure, but the present disclosure is not limited thereto. In the embodiment, the second assembling member 146 of the pivot assembly 14 is connected to the positioning portion 1400 of the fixing member 140 opposite to an end of the elastic portion 16 and has a second assembling hole 1460 and notches 1462a, 1462b and 1462c. The notches 1462a, 1462b and 1462c of the second assembling member 146 surround the second assembling hole 1460 and are respectively recessed toward the second assembling hole 1460.

Then, as shown in FIG. 3B, the box 10 of the container 1 includes protruding portions 102, 104a, 104b, and 104c. The protruding portions 102, 104a, 104b, and 104c of the box 10 pass through the second assembling hole 1460 and the notches 1462a, 1462b and 1462c of the second assembling member 146 respectively (as shown in FIG. 2A), thereby fixing the pivot assembly 14 to the box 10 to complete the assembly of the container 1. In the embodiment, the protruding portion 102 is a cylindrical structure, but the present disclosure is not limited thereto. The protruding portions 104a, 104b, and 104c are non-cylindrical cylinders, and further prevent the fixing member 140 from rotating after being pressed. For example, the protruding portions 104a, 104b, and 104c are quadrangular cylinders, and the edges of the cylinders are chamfered to facilitate the passage through the notches 1462a, 1462b, and 1462c of the second assembly 146 (as shown in FIG. 2A).

Figure 4A:
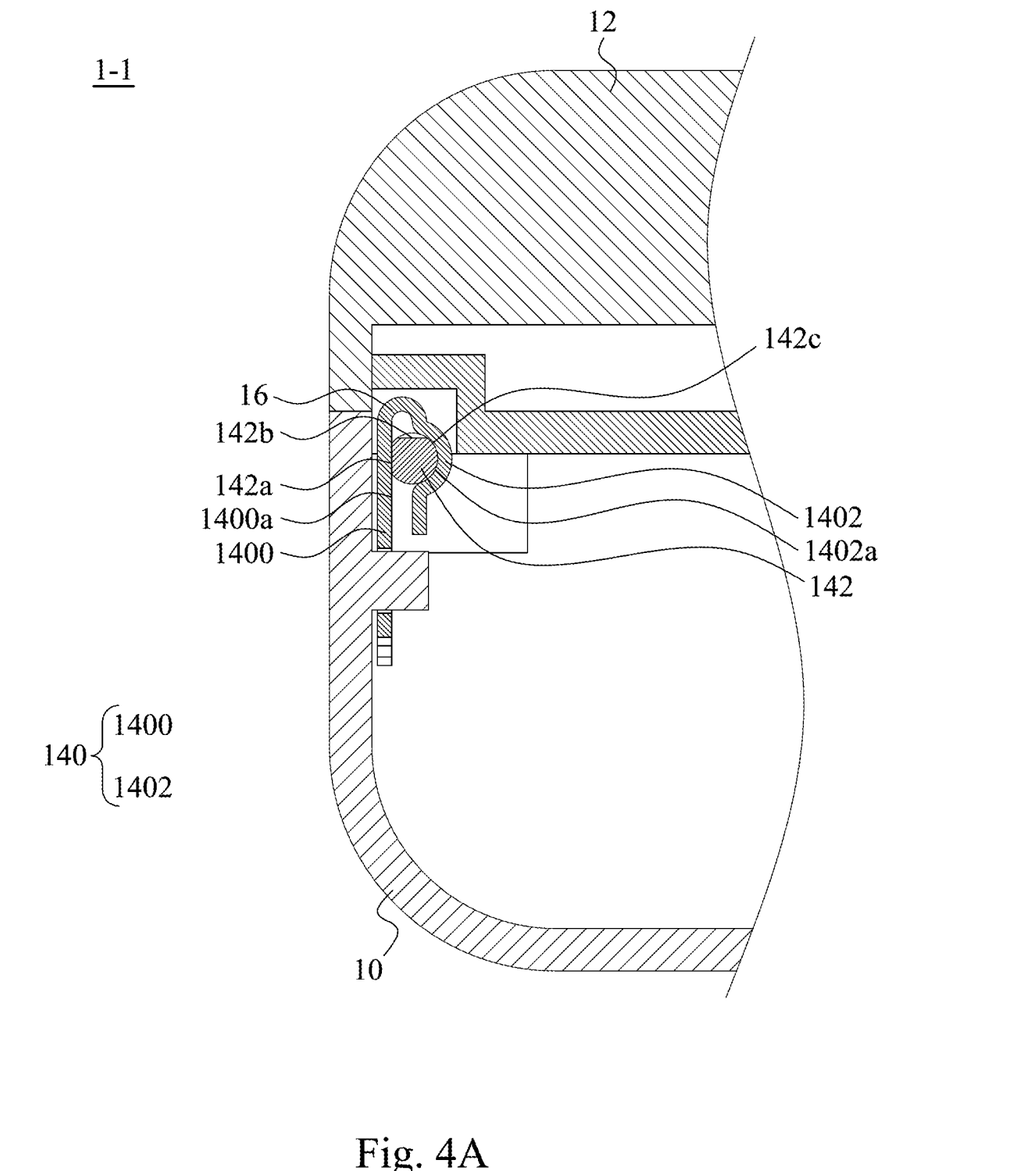
FIG. 4A, FIG. 4B, and FIG. 4C are partial cross-sectional views of the container viewed along line 1-1 in FIG. 1A, respectively, in which a cover shown in FIG. 4A covers a box, the cover shown in FIG. 4B is opened 45 degrees with respect to the box, and the cover shown in FIG. 4C is opened 90 degrees with respect to the box.
Figure 4B:
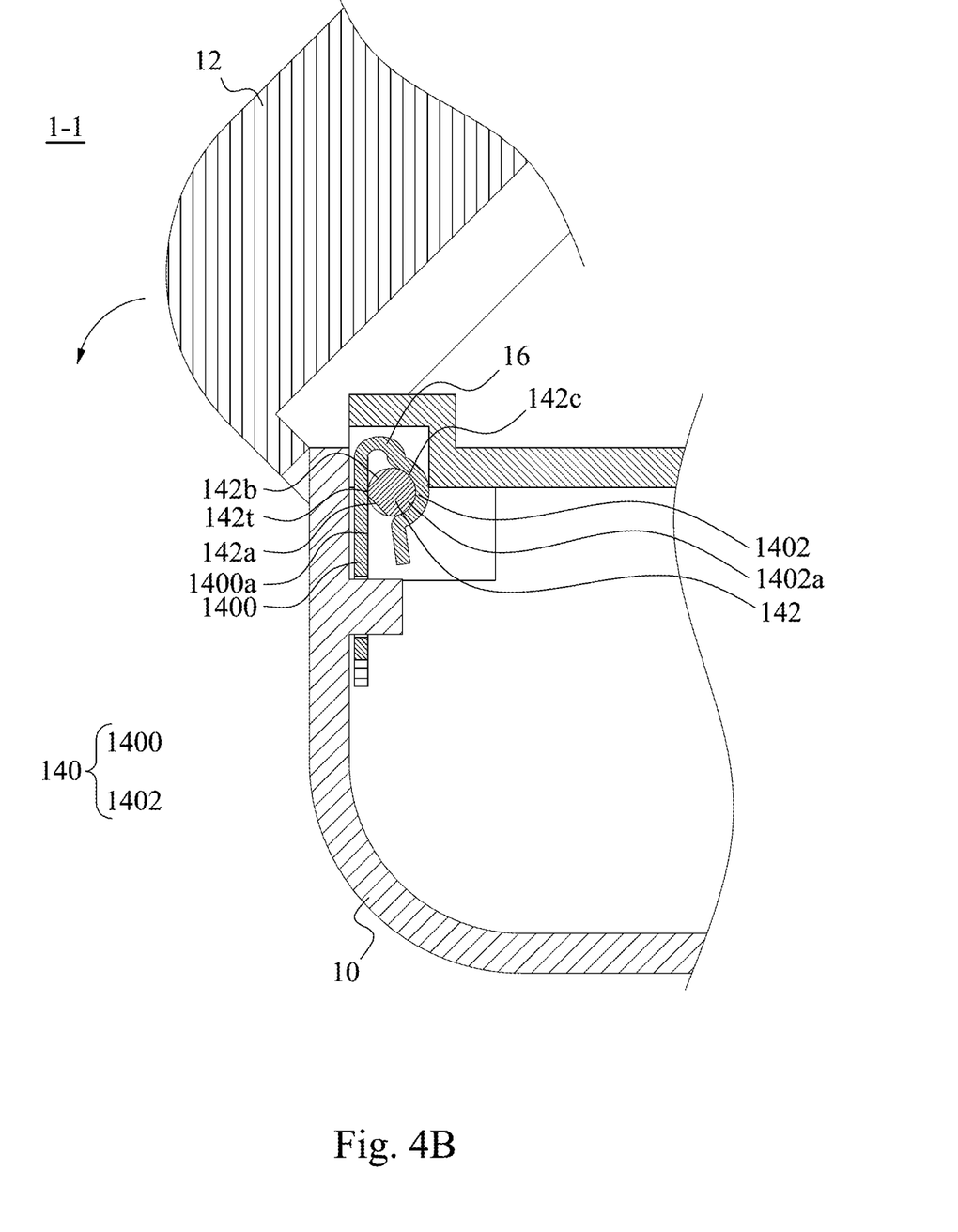
Figure 4C:
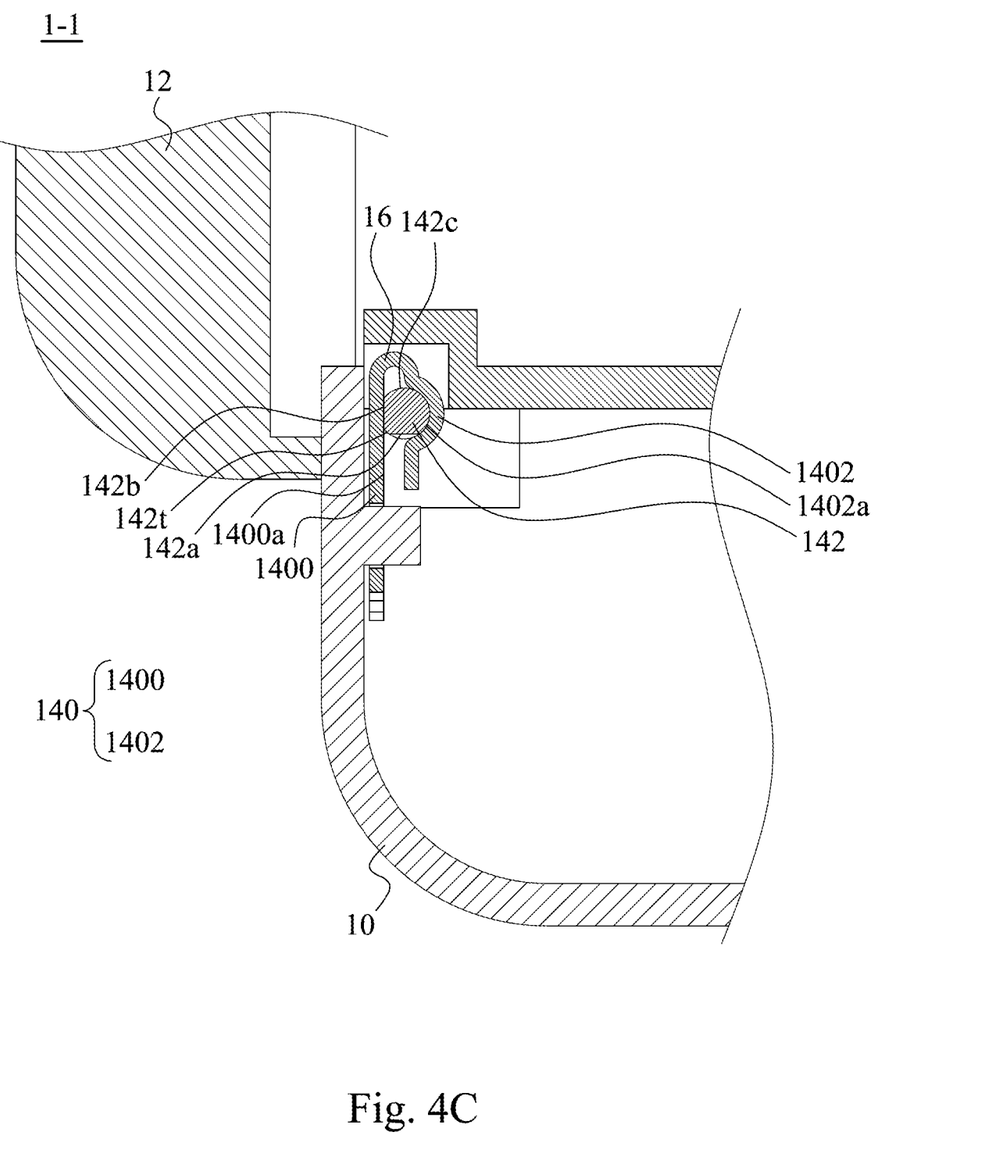

FIG. 4A, FIG. 4B, and FIG. 4C are partial cross-sectional views of the container viewed along line 1-1 in FIG. 1A, respectively, in which the cover 12 shown in FIG. 4A covers the box 10, the cover 12 shown in FIG. 4B is opened 45 degrees with respect to the box 10, and the cover 12 shown in FIG. 4C is opened 90 degrees with respect to the box 10.

In FIG. 4A, when the cover 12 of the container 1 covers the box 10, the positioning portion 1400 of the fixing member 140 of the pivot assembly 14 abuts against the first abutting surface 142a of the rotating member 142.

In FIG. 4B, the cover 12 is opened relative to the box 10. The first assembling member 144 (as shown in FIG. 3A) connected to the cover 12 drives the rotating member 142 to rotate. While the rotating member 142 is rotating relative to the fixing member 140 connected to the box 10, the acting curved surface 142c of the rotating member 142 abuts against and rotates relative to the limiting surface 1402a of the limiting portion 1402. At the same time, the turning surface 142*t* of the rotating member 142 abuts against and moves relative to the positioning surface 1400*a* of the positioning portion 1400. Furthermore, during the rotation of the rotating member 142, the rotating member 142 presses the limiting portion 1402 of the fixing member 140, such that a distance between the limiting portion 1402 and the positioning portion 1400 is increased, and then the rotating member 142 can overcome an interference of the fixing member 140 on the structural arrangement and thus rotate until the second abutting surface 142*b* of the rotating member 142 contacts the positioning portion of the fixing member 140, as shown in FIG. 4C.

In some embodiments, the elastic portion 16 drives the limiting portion 1402 to continuously press the rotating member 142. When the cover 12 is opened relative to the box 10 by more than half of the angle A (as shown in FIG. 2B), the second abutting surface 142*b* of the rotating member 142 can automatically approach and abut against the positioning portion 1400 of the fixing member 140 due to the pressing of the limiting portion 1402. Therefore, the cover 12 of the container 1 connected to the rotating member 142 is brought into position with respect to the positioning of the box 10.

For example, if the angle A between the first abutting surface 142*a* and the second abutting surface 142*b* is designed to be 90 degrees, when the cover 12 is opened more than 45 degrees with respect to the box 10, the second abutting surface 142*b* of the rotating member 142 can automatically approach and abut against the positioning portion 1400 of the fixing member 140 due to the pressing of the limiting portion 1402, thereby enabling the cover 12 of the container 1 connected to the rotating member 142 to be positioned at 90 degrees with respect to the box 10.

In FIG. 4C, when the cover 12 of the container 1 is opened at an angle A with respect to the fixing member 140, the positioning portion 1400 of the fixing member 140 of the pivot assembly 14 abuts against the second abutting surface 142*b* of the rotating member 142.

Thereby, after the user flips the cover 12, the cover 12 can automatically position relative to the box 10 at an open position defined by the designed angle A(as shown in FIG. 2B) between the first abutting surface 142*a* and the second abutting surface 142*b* of the rotating member 142. For example, If the angle A between the first abutting surface 142*a* and the second abutting surface 142*b* is designed to be 90 degrees, the cover 12 can automatically position at 90 degrees at an open position relative to the box 10 after the cover 12 is opened by the user, but the present disclosure is not limited thereto. That is, a plurality of planes in the pivoting assembly 14 (eg, the first abutting surface 142*a* and the second abutment surface 142*b* of the rotating member 142) can be used to position the angle at which the cover 12 of the container 1 is opened relative to the box 10.

Moreover, when the user accidentally touches the cover 12 such that the cover 12 is opened relative to the case 10 by less than half of the angle A, since the limiting portion 1402 presses the rotating member 142 to recover the rotating member 142, the cover 12 connected to the rotating member 142 can automatically cover the box 10. In contrast, when the cover 12 is opened at an angle A with respect to the box 10, the elastic portion 16 presses the positioning portion 1400 and the limiting portion 1402, thereby preventing the rotating member 142 between the positioning portion 1400 and the limiting portion 1402 from rotating, such that the cover 12 connected to the rotating member 142 is positioned. Therefore, the user needs to apply a force to overcome the compression of the elastic portion 16 to cause the cover 12 to rotate relative to the box 10.

According to the foregoing embodiments of the disclosure, it can be seen that, by the angle between the first abutting surface and the second abutting surface of the rotating member of the pivoting assembly, after the user flips the cover of the container, the cover can automatically position relative to the box at the open position defined by the aforementioned angle. That is, a plurality of abutting faces in the pivoting assembly can be used to position the angle at which the cover in the container opens relative to the box.

Moreover, when the user accidentally touches the cover such that the cover is opened relative to the box body and is less than half of the aforementioned angle, since the limiting portion presses the rotating member to recover the rotating member, the cover connected to the rotating member can automatically cover the box. In contrast, when the cover opens the aforementioned angle with respect to the box, the cover connected to the rotating member is positioned because the elastic portion presses the positioning portion and the limiting portion to prevent the rotating member between the positioning portion and the limiting portion from rotating. Therefore, the user needs to apply a force to overcome the compression of the elastic portion to cause the cover to rotate relative to the box.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A container, comprising:
  a pivoting assembly comprising:
    a fixing member comprising a positioning portion and a limiting portion having a limiting surface facing the positioning portion, wherein the limiting surface is a curved concave surface; and
    a rotating member being clamped between the positioning portion, the limiting portion and being configured to rotate relative to the fixing member, and having first and second abutting surfaces and an acting curved surface surrounding thereof, wherein while the rotating member is rotating relative to the fixing member, the acting curved surface bears against and rotates relative to the limiting surface, thereby enabling the positioning portion to selectively abut the first abutting surface or the second abutting surface;
  a box connected to the fixing member of the pivoting assembly; and
  a cover connected to the rotating member of the pivoting assembly.

2. The container of claim 1, wherein the limiting surface of the fixing member has a first curvature, and the acting curved surface has a second curvature substantially the same as the first curvature.

3. The container of claim 1, wherein the positioning portion has a positioning surface facing the limiting portion, and a profile of the positioning surface is complimentary to the first and second abutting surfaces of the rotating member.

4. The container of claim 1, wherein each of the first and second abutting surfaces is flat.

5. The container of claim 1, wherein the first and second abutting surfaces of the rotating member form a V-shaped profile.

6. The container of claim 1, wherein the rotating member further comprises a turning surface that is connected between the first and second abutting surfaces and protrudes away from the acting curved surface.

7. The container of claim 1, further comprising an elastic element that is connected between the positioning portion and the limiting portion and is configured to cause the positioning portion and the limiting portion to clamp the rotating member.

8. The container of claim 1, wherein an extension of the first abutting surface and an extension of the second abutting surface of the rotating member intersect[s] at an first angle, when the cover covers the box, the positioning portion of the fixing member abuts against the first abutting surface of the rotating member, and when the cover is opened by rotating the first angle relative to the fixing member, the positioning portion of the fixing member abuts against the second abutting surface of the rotating member.

9. The container of claim 1, wherein the cover has an assembling hole and the pivoting assembly further comprises an assembling member that is connected to the rotating member and is detachably fixed to the assembling hole of the cover.

10. The container of claim 9, wherein the assembling member has a non-circular cross section.

\* \* \* \* \*